Figure 1:
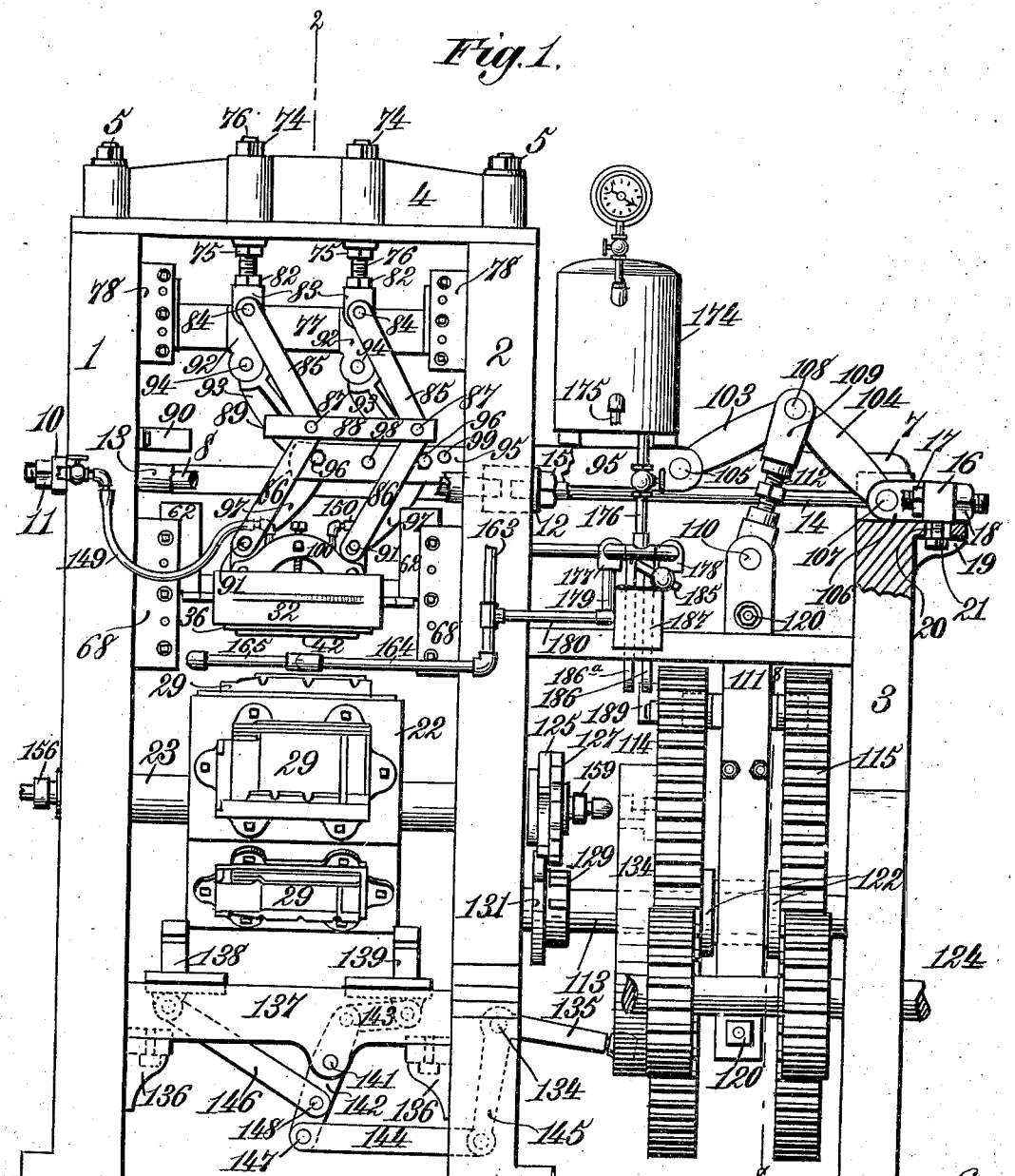

No. 687,688.　　　　　　　　　　　　　　　Patented Nov. 26, 1901.
A. B. KLAY.
MACHINE FOR PRESSING PLASTIC SUBSTANCES.
(Application filed July 20, 1901.)

(No Model.)　　　　　　　　　　　　　　　　　　5 Sheets—Sheet 1.

Witnesses.
Robert Everett.
F. O. Parker.

Inventor.
Abraham B. Klay,
By James L. Norris.
Atty.

No. 687,688. Patented Nov. 26, 1901.
A. B. KLAY
MACHINE FOR PRESSING PLASTIC SUBSTANCES.
(Application filed July 20, 1901.)
(No Model.) 5 Sheets—Sheet 3.

Witnesses:
Robert Garrett
F. O. Parker

Inventor:
Abraham B. Klay
By James L. Norris
Atty.

THE NORRIS PETERS CO., PHOTO-LITHO., WASHINGTON, D. C.

No. 687,688.  
A. B. KLAY.  
MACHINE FOR PRESSING PLASTIC SUBSTANCES.  
(Application filed July 20, 1901.)  
(No Model.)  
Patented Nov. 26, 1901.  
5 Sheets—Sheet 4.
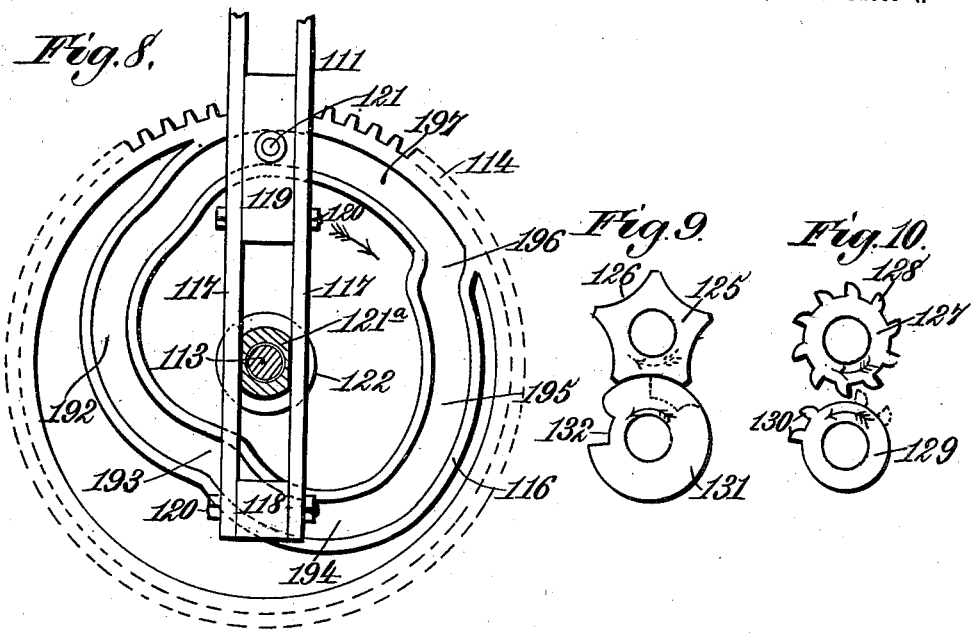
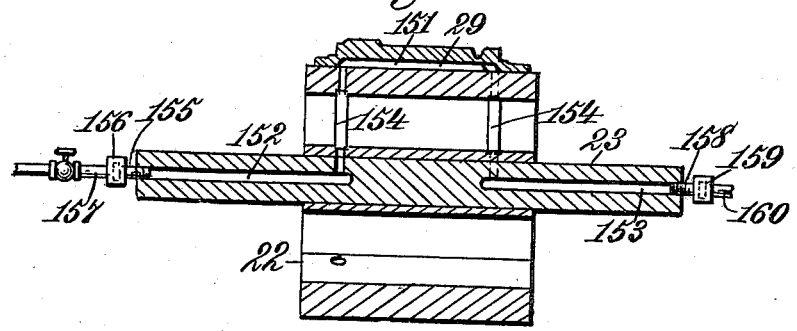
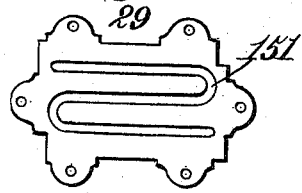
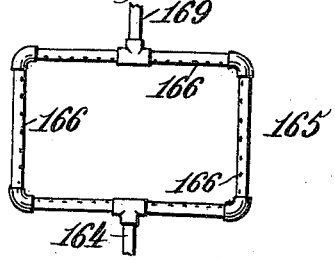
Witnesses.  
Inventor.  
Abraham B. Klay.  
By James L. Norris.  
Atty.
THE NORRIS PETERS CO., PHOTO-LITHO., WASHINGTON, D. C.

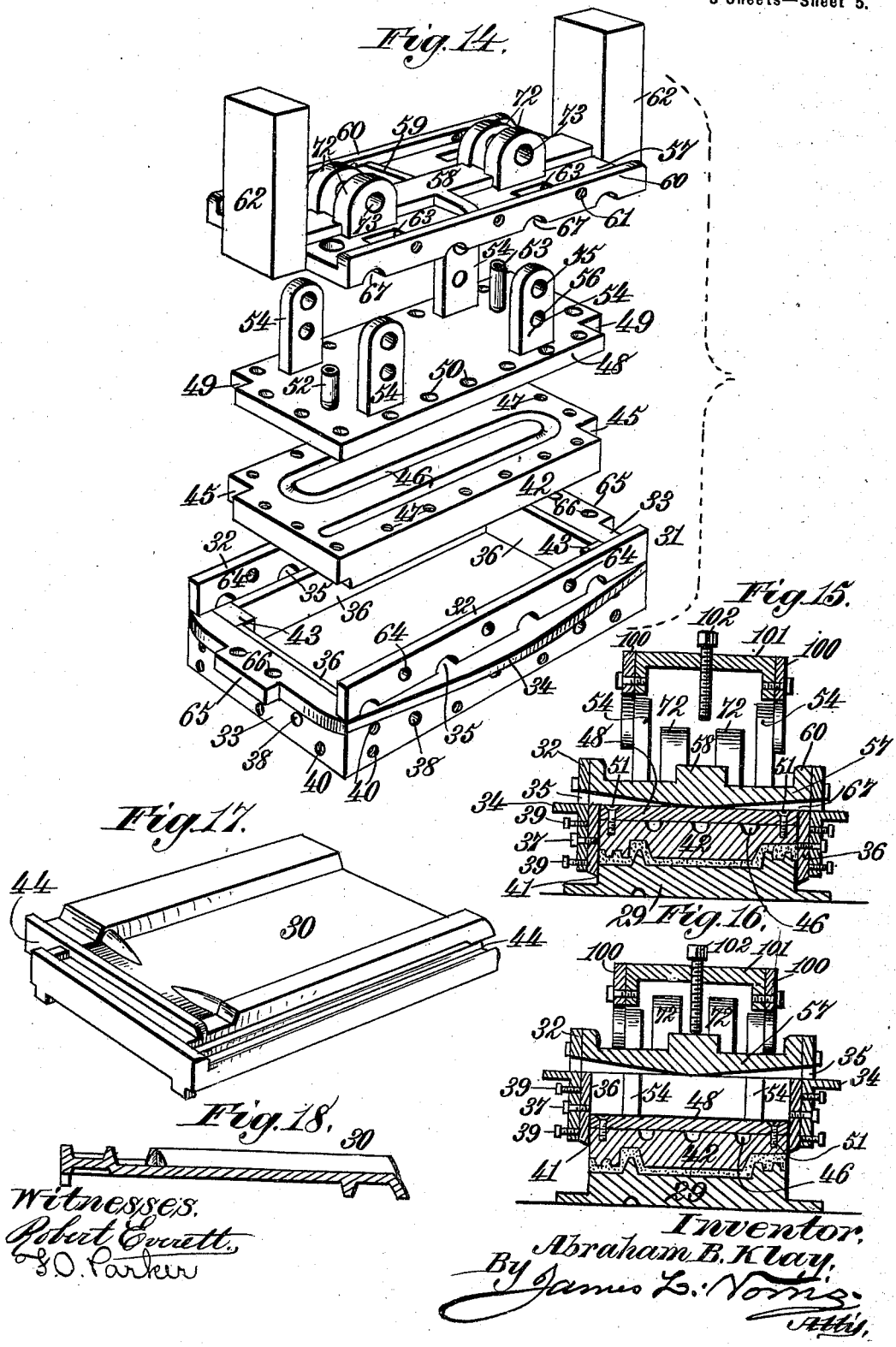

UNITED STATES PATENT OFFICE.

ABRAHAM B. KLAY, OF OTTAWA, OHIO, ASSIGNOR TO THE A. B. KLAY COMPANY, A CORPORATION OF WEST VIRGINIA.

MACHINE FOR PRESSING PLASTIC SUBSTANCES.

SPECIFICATION forming part of Letters Patent No. 687,688, dated November 26, 1901.

Application filed July 20, 1901. Serial No. 69,104. (No model.)

*To all whom it may concern:*

Be it known that I, ABRAHAM B. KLAY, a citizen of the United States, residing at Ottawa, in the county of Putnam and State of Ohio, have invented new and useful Improvements in Machines for Pressing Plastic Substances, of which the following is a specification.

My invention relates to improvements in that class of machines for pressing plastic substances wherein a revoluble platen-drum is arranged below and adapted to coact with a reciprocating die or plunger, and has special reference to a machine for pressing roofing-tiles.

An objection existing in this art prior to my invention, and which it has been found desirable to avoid in the interest of economy in manufacture, is that it has been found necessary to provide the core-box or mold with outwardly-sloping sides on the interior, so that the pressed article could be more readily removed therefrom. As a result the pressed article would have beveled instead of straight edges and would have to be trimmed down by hand. This process, besides being slow, greatly added to the cost of manufacture. According to my invention I provide improved means for so operating the core-box in relation to the plunger or die that the tile is provided with straight edges at the time it is pressed, thus enabling me to dispense with the services of a number of attendants formerly found necessary to trim the tiles as pressed.

One of the principal objects of my invention is to provide improved means for lubricating the dies, whereby to insure that the pressed article will readily fall from the platen-drum at the proper time or, if a machine having a stationary platen be employed, that the pressed article may be readily removed from the die.

Another object had in view is to provide improved means for centering the platen-drum and holding the same rigid during the pressing operation, which means shall also act as a support or brace for the drum to enable it to withstand the heavy pressure to which it is subjected.

The construction and operation of parts whereby the above-named objects are attained constitute the salient features of the invention. Other objects are had in view, however, relating to features of construction and to combinations, arrangements, and operations of parts, which will be more clearly understood from the detailed description to follow.

I have illustrated my invention in the accompanying drawings, in which—

Figure 2:
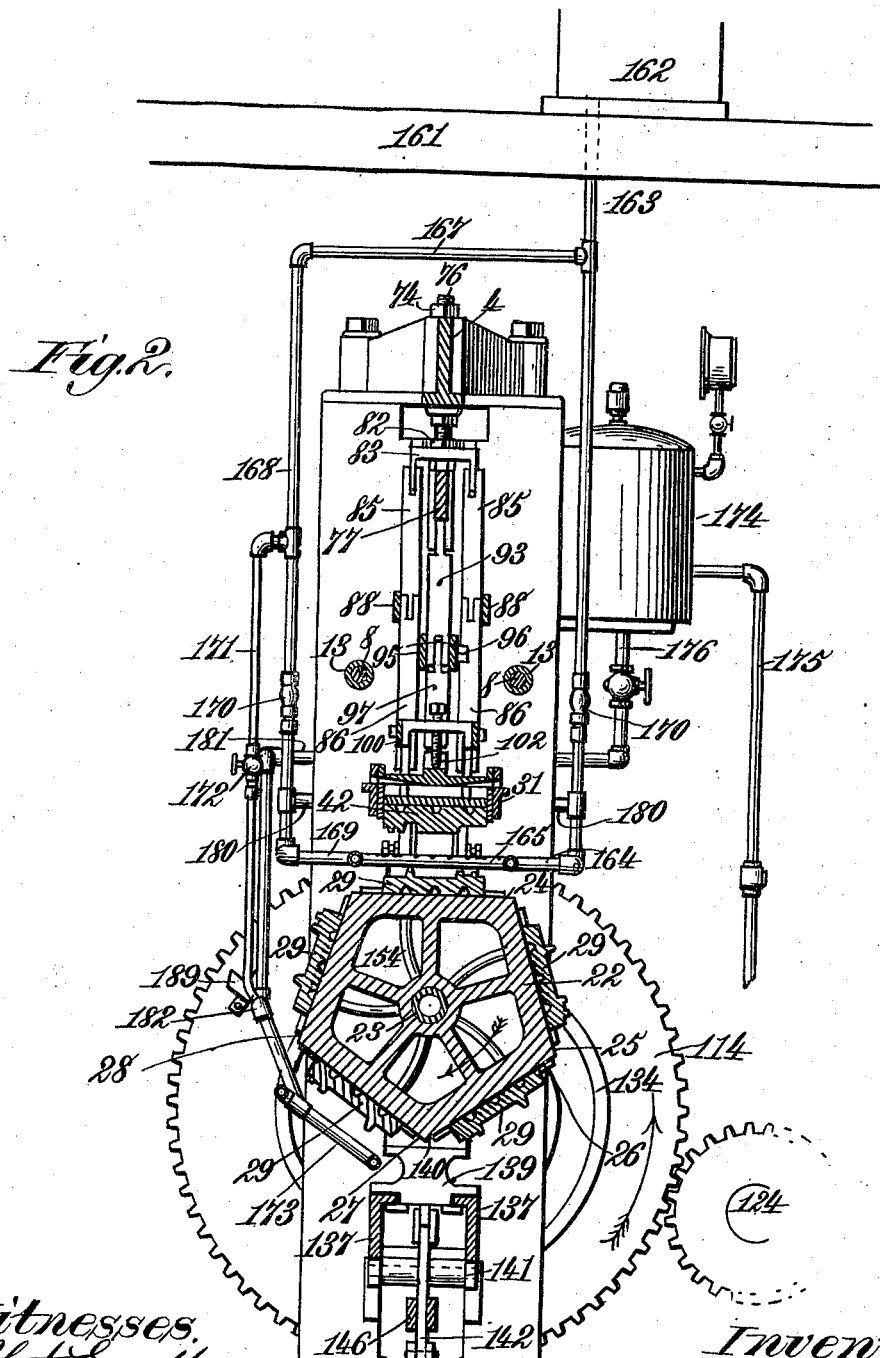
Figure 3:
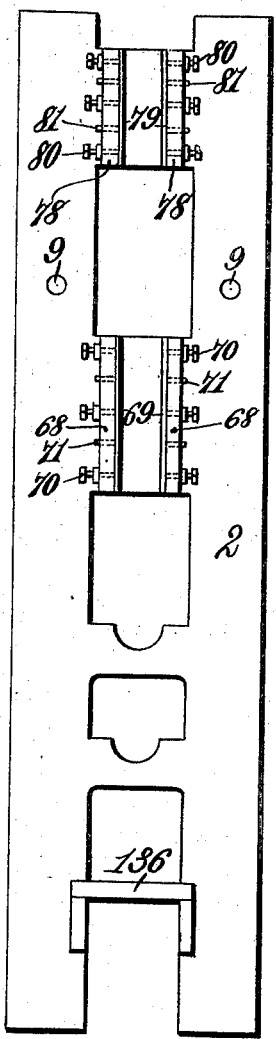
Figure 4:
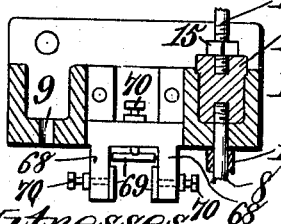
Figure 5:
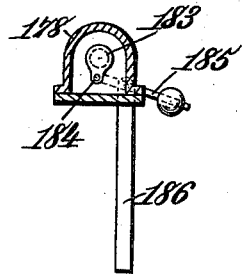
Figure 6:
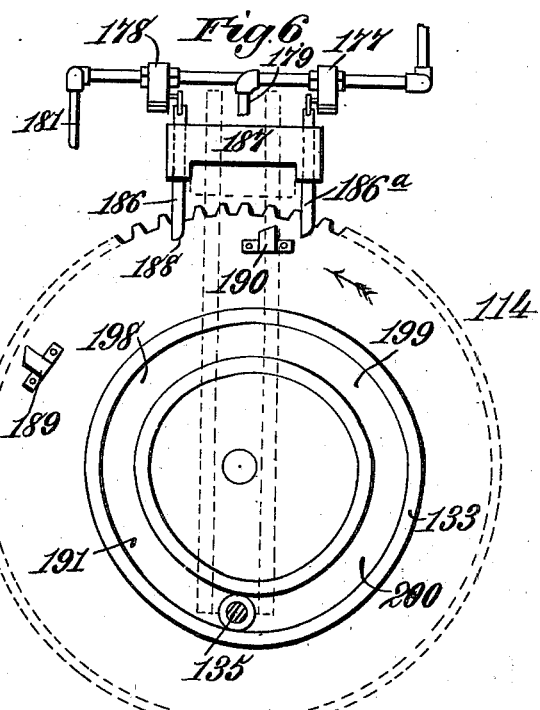
Figure 7:
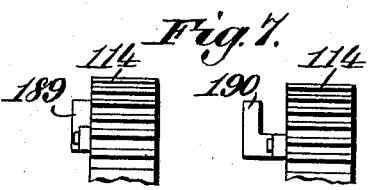

Figure 1 is a view in front elevation of a machine constructed according to my invention. Fig. 2 is a section on the line 2 2 of Fig. 1 and viewed in the direction of the arrows. Fig. 3 is a face view of the intermediate upright of the machine. Fig. 4 is a plan view of the same. Fig. 5 is a sectional view of one of the air-valves. Fig. 6 is a view in elevation, illustrating the air-valve mechanism and one of the cam-wheels of the machine having tappets thereon for operating the air-valves at predetermined intervals. Fig. 7 shows broken detached views illustrating the manner of arranging the tappets on the cam-wheel. Fig. 8 is a section on the line 8 8 of Fig. 1, the view showing the opposite face of the cam-wheel illustrated in Fig. 6. Fig. 9 is a detail view illustrating the stop and release mechanism for controlling the revolution of the platen-drum. Fig. 10 is a similar view illustrating the mechanism for imparting at regular intervals one-fifth of a revolution to the platen-drum. Fig. 11 is a section through the platen-drum and its shaft. Fig. 12 is a bottom plan view of one of the lower dies. Fig. 13 is a detail view of one of the spraying-frames. Fig. 14 is a perspective view of the upper-die mechanism, the parts composing the same being shown detached, but in the relative positions they occupy when assembled. Fig. 15 is a section through the assembled parts of said upper-die mechanism, the die and core-box being in their lowest position and a tile being shown compressed between the upper and lower die. Fig. 16 is a similar view, the core-box being raised and a member of the die mechanism about to engage a set-screw to elevate the upper die. Fig. 17 is a perspective view of a roofing-tile which has been pressed in the machine, and Fig. 18 is a transverse section of the same.

Referring now to the drawings, 1, 2, and 3 designate the main uprights of the machine, of which uprights that designated by the numeral 2 is referred to herein as the "intermediate" upright. The uprights 1 2 are of the same height and are connected at their upper ends by means of a stout cross-beam 4, bolted thereto, as indicated at 5, and in common with the upright 3 are secured at their lower ends to a suitable base 6. The upright 3, which is considerably shorter than the other uprights, is connected at its upper end to the upright 2 by means of a beam 7. In order that the uprights may withstand the lateral strain to which they are subjected in the operation of the machine, I further brace them in the following manner: 8 8 indicate rods screw-threaded at each end. These rods are passed through openings located near opposite sides of the upright 1, said openings not being shown, but being similar to the openings 9 9, formed in the upright 2, as shown in Fig. 3. The end of each rod 8, passed through the upright 1, is then provided with a washer 10 and an adjusting-nut 11. The opposite end of each rod is screwed into one end of a block 12, inserted in the channels of the upright 2 on the outer side thereof, as shown in Figs. 1 and 4. Surrounding each rod 8 is a sleeve 13, the outer ends of which abut against the inner sides of the uprights 1 and 2. By screwing up the nut 11 the uprights 1 and 2 will be brought into firm engagement with the ends of the sleeves 13, which will thereby brace the uprights against inward pressure, while said rods, the nuts 11, and blocks 12 will brace said uprights against outward pressure. It is desirable that braces shall extend between the uprights 2 and 3 in the same plane with the rods 8. To this end similar rods 14 are screwed at one end into the opposite ends of the blocks 12 and provided with jam-nuts 15 adjacent to said blocks. The other ends of said rods are also screw-threaded and passed through apertures near opposite ends of an adjusting-block 16 and provided with jam-nuts 17 and adjusting-nuts 18. The nature of the view in Fig. 1 permits only one set of the various nuts described to be shown; but it will be understood that at the opposite side of the machine from that shown the rods 8 and 14 are secured in the same manner as shown in Fig. 1. The block 16 rests upon a flanged extension 19 of the upright 3, which is provided with a slotted aperture 20, through which extends a bolt 21, screwing into the block 16, and the purpose of which is to hold the block down upon its seat or support 19. By manipulating the nuts 17 and 18 in a manner well understood the block 16 can be adjusted to and secured in a given position on the rods 14. When these nuts are screwed firmly against the block 16, said block will be held from movement either inward or outward. The purpose of the adjustment of this block will be presently described.

22 indicates the platen-drum, which is fast upon a shaft 23, mounted in suitable bearings in the uprights 1 2. As shown in Fig. 2, the platen-drum is five-sided, said sides being designated by the numerals 24, 25, 26, 27, and 28, respectively. On each of these sides is secured a lower-die member 29, having the configuration necessary to impart the required shape to the under side of a roofing-tile 30, such as illustrated in Figs. 17 and 18. These die members are preferably made of brass, but may be made of other metal. The upper-die mechanism comprises the parts now to be described.

31 indicates a core-box rectangular in shape in the present instance and having relatively high sides 32 and lower ends 33. Extending around the core-box is a strengthening-rib 34, and just above this rib the sides 32 are provided with a series of semicircular openings 35, the purpose of which will presently appear. On the inside the core-box is provided with a brass lining 36, held by means of screws 37, passed through smooth-bore apertures 38 in the sides and ends of the core-box and screwing part way into the lining and adjusted inwardly by means of screws 39, engaging in screw-threaded apertures 40 in said sides and ends and bearing at their ends against the outer sides of the lining. The brasses 36 extend a short distance below the core-box, as shown in Figs. 15 and 16, and such projecting edges are beveled or provided with a knife-edge 41, so that on the descent of the core-box the surplus clay may be cut evenly from the body of clay to be pressed, leaving the same with clean-cut straight edges.

The numeral 42 indicates the upper-die member, which is fitted snugly but movably in the core-box, said core-box being provided with interior projections 43, located in two opposite corners for providing the necessary recesses 44 at opposite corners of the tile, and the die 42 is provided at corresponding corners with recesses 45, which slide over the projections 43. The under side or face of the die is suitably formed to give to the upper side of the molded article the shape shown in Figs. 17 and 18, and its upper side is provided with a serpentine groove 46, which begins at or near one of the corners of the die not provided with a recess 45 and terminates near the corresponding opposite corner. The upper side of said die is also provided with a series of screw-threaded apertures 47, located at more or less frequent intervals near the side and end edges of said die. The upper die is also preferably made of brass; but, as in the case of the lower die, it may be made of other metal, if preferred. The numeral 48 indicates a metal plate of the same size as the upper die and having corresponding corner-recesses 49 and apertures 50, which latter, however, are smooth-bore. The plate 48 is securely fastened to the upper side of the die 42 by means of screw-bolts 51, passed through the apertures 50 and engaging in the apertures 47. The plate 48 is provided with short pipes 52 53, which communicate, respectively, with opposite ends of the serpentine passage 46, rendered otherwise steam-tight by the plate 48. On the upper side of the plate 48 and near each corner thereof is located a standard 54, provided with an upper and lower aperture 55 56, respectively.

57 indicates the core-box cover and comprises a metal plate suitably strengthened by means of a horizontal rib 58 and a transverse rib 59. At the sides said plate is provided with upward-extending flanges 60, provided with exterior screw-threaded apertures 61, and at each end of said plate is an integral rectangular guide-block 62. The cover 57 is also provided with four rectangular openings 63, through which the standards 54 are adapted to pass. The core-box 31 is provided in its sides, above the brasses 36, with a series of apertures 64, which are designed to coincide with the screw-threaded apertures 61 in the flanges 60, and the rib 34 at each end of the core-box is provided with a rectangular projection 65, having apertures 66. The cover 57 is designed to be secured to the top of the core-box, and to this end the holes 63 are passed over the standards 54 and the cover 57 inserted between the sides 32 of said core-box. The cover will now rest upon the ends 33 and rib 34, and the bottoms of the guide-block 62 will rest upon the extensions 65. Screw-bolts are now passed through the apertures 64 and screwed into the apertures 61 and through the apertures 66 and screwed into the bottoms of the guide-blocks 62. The bottom of the cover 57 is provided with a series of grooves 67, which start at points located to one side of the longitudinal center of the cover and gradually widen as they approach the sides thereof, where they terminate in semicircular openings coinciding with the apertures 35 in the sides of the core-box. By reason of said grooves and apertures any clay that may have gotten in between the cover 57 and the plate 48 will be forced or squeezed out in the pressing operation. This may be readily understood by an inspection of Figs. 15 and 16. As shown in Figs. 1, 3, and 4, each of the uprights 1 2 is provided intermediate its ends with two parallel inwardly-extending flanges or plates 68, affording a rectangular guideway for the guide-blocks 62. Said guide is provided on its three sides with wear-plates 69, adjusted by means of set-screws 70 and having pins 71 inserted in apertures in the flanges 68 for holding them in place. By adjusting these wear-plates the guide-blocks 62 may be made to move evenly and smoothly between the guides 68, and thus impart uniformity of movement to the upper-die mechanism. On the top of the cover 57, and near each end thereof, are provided two lugs 72, having a space between them and provided with coincident apertures 73.

The mechanism for operating the upper-die mechanism will now be described. Adjustably mounted in the cross-beam 4 by means of adjusting-nuts 74 and jam-nuts 75 are two bolts 76, the lower end of each of which is screwed into the upper side of an iron beam 77, the opposite ends of which are adjustably mounted between parallel flanges or plates 78, extending inward from the uprights 1 and 2, near the upper ends thereof, by means of clamping-plates 79 and set-screws 80. Pins 81 hold the clamping-plates in place. Adjustably mounted on each bolt 76 by means of nuts 82 is a yoke 83, having depending ends, to each of which is pivotally secured at 84 the upper bifurcated end of a toggle-arm 85. Similar toggle-arms 86 are pivotally connected to the lower ends of the toggle-arms 85 to form toggle-levers, and at the points 87 of these pivotal connections bars 88 connect the two pairs of toggle-levers, as clearly shown in Figs. 1 and 2. The bars 88 have projecting ends 89, which are adapted to engage stops 90, secured on the upright 1, to limit the throw of the toggle-levers in the pressing movement thereof, as presently described. The lower ends of the toggle-arms 86 are bifurcated and pivotally secured, as indicated at 91, in the upper holes 55 of the respective standards 54. The lower ends of the toggle-arms 86 have a slotted connection with the pivots 91, as shown in Fig. 1, to allow a limited upward movement of the upper die independent of said toggle-arms for a reason to be presently explained. The toggle-lever mechanism just described is for operating the upper die 42. Pivotally secured at their upper ends between straps 92 in the beam 17 are two toggle-arms 93, the pivotal connection being indicated at 94. At their lower ends these toggle-arms are pivotally connected at equal distances apart to the end of a horizontally-disposed bar 95, as indicated at 96 96, and also to the upper ends of toggle-arms 97. The lower ends of the toggle-arms 97 are pivotally secured in the space between the respective sets of lugs 72 on the cover 57 of the core-box by means of pins passed through the apertures 73 and through the ends of said arms. The toggle-levers just described are for operating the core-box and work between and parallel with the two sets of toggle-levers 85 86, as clearly shown in Fig. 2. These latter toggle-levers are operated by means of stops 98 99 on the bar 95, as described later. Secured at opposite ends to the outer side of each end standard 54 at the apertures 56 are two arches 100, (shown in Figs. 1, 15, and 16,) which are connected by a cross-tie 101. Centrally of this cross-tie is a relatively long set-screw 102, the lower end of which is adapted to be engaged by the rib 58 on the core-box cover in the upward movement of the core-box to lift the upper die.

103 104 indicate, respectively, the two members of a toggle-lever pivotally connected, respectively, to one end of the bar 95 at 105, to a lug 106 of the block 16 at 107, and at their inner ends, at 108, to the upper end of a lever-arm 109, the opposite end of which is pivotally secured at 110 to the upper end of a bar 111, which to distinguish more clearly I will term the "cam-bar." The lever-arm 109 is constructed in two parts, as shown, connected by a bolt 112, having right and left hand screw-threads, whereby the length of said lever-arm may be adjusted. Mounted in suitable bearings in the uprights 2 3 is a shaft 113, having fast thereon two cam-wheels 114 115, provided on their inner sides with similar camways, one of which (designated by 116) is shown in Fig. 8. As shown also in this figure, the cam-bar 111 is constructed of two similar bars 117, which are held in spaced parallel relation by means of blocks 118 119, inserted between them, and secured by bolts 120, passed through said bars and blocks. The block 118 is located at the lower end of the cam-bar, while the block 119 is located a suitable distance from the upper end of said bar and has projecting from its opposite sides pins 121, which work in the corresponding camways of the cam-wheels 114 115. A sufficient space is provided between the two blocks 118 119 to permit of the movement of the bars 117 over a flat-sided sleeve 121ª, loosely mounted on the shaft 113 and having at its ends annular flanges 122, located in close proximity to opposite side edges of said bars. The purpose of said sleeve and flanges is to guide the cam-bar so that the same shall have substantially a direct up-and-down movement under the action of the cam-wheels. The cam-wheels are provided with teeth on their periphery and are revolved by means of two intermeshing cog-wheels 123, fast on a drive-shaft 124, which is mounted in bearings in the uprights 2 3. The means for driving the shaft 124 are not shown. Fast on the end of the drum-shaft 23 and adjacent to the upright 2 are a star-wheel 125, having five curved faces 126, and a spur-gear 127, having ten teeth 128. (See Figs. 9 and 10.) These parts are located side by side, as shown by Fig. 1. On the end of the cam-wheel shaft 113 adjacent to the upright 2 are secured a mutilated gear 129, having two teeth 130, adapted to mesh with the teeth of the spur-gear 127, and an escape-wheel 131, normally in engagement with one or the other of the curved faces 126 of the star-wheel 125 to prevent revolution of the latter, but having a recess 132, which one or the other of the points of the star-wheel may enter to permit the star-wheel to make one-fifth of a revolution. The mutilated gear 129 and the escape-wheel 131 revolve continuously and in unison, while the spur-gear 127 and the star-wheel 125 are revolved intermittently and in unison by the engagement of the teeth of the mutilated gear with said spur-gear. There being ten teeth in the spur-gear and two in the mutilated gear, it follows that with each engagement of the teeth of the latter with those of the former the spur-gear will be given a fifth-revolution, and as the said spur-gear is fast on the shaft 23 said shaft, with the drum 22, will also be given a fifth-revolution. In other words, with each complete revolution of the mutilated gear 129 the drum will be turned to bring a die 29 immediately under the upper die 42.

I will now describe the mechanism for centering the platen-drum and supporting it during the pressing operation. On the outer face of the cam-wheel 114 I provide a second camway 133. Pivotally mounted at 134 in the upright 2 is a bell-crank lever, one arm 135 of which has its end engaging in said camway 133. (See Figs. 1 and 6.) Said end will preferably be provided with a friction-roller for engaging in the camway. Suitably secured to and supported upon castings 136 on the uprights 1 and 2 are two guide-rails 137, Figs. 1 and 2, slidably secured on which are two cross-holes 138 139, the top of each of which is provided with a V-shaped recess 140, adapted to receive one or the other of the angles of the platen-drum. Pivotally mounted intermediate its ends, between the guide-rails 137, at 141, is a lever 142, the upper end of which is connected by a link 143 with the under side of the cross-head 139. A second link 144 connects the lower end of the lever 142 with the outer end of the other arm 145 of the bell-crank lever above mentioned. A lever-arm 146 is pivotally connected at one end to the under side of the cross-head 138 and at its opposite end is pivotally connected to the lever 142 centrally between the pivot 141 and the pivot 147 at its lower end, as indicated at 148. The operation will be given later on.

In order to heat the upper die, I attach to the pipe 52 on the plate 48 of the upper die a flexible pipe 149, leading from a suitable source of steam-supply, and to the other pipe 53 I attach a similar flexible pipe 150 to serve as an escape-pipe for the steam and water of condensation. Suitable cocks may be provided in the pipes for controlling the supply and escape of the steam. By this means I am enabled to continuously pass steam through the passage 46, and thereby heat the upper die to the proper temperature to prevent the pressed clay from adhering thereto.

The lower dies are heated in the following manner: As shown in Fig. 12, each lower die is provided with a serpentine groove 151 in its bottom, which when the die is secured on the drum forms a passage. The axle 23 of the drum is provided with passages 152 153, leading, respectively, from opposite ends of the axle to points slightly within the drum, where pipes 154 connect the inner ends of said passages with opposite ends of the groove 151 in each die. Secured into the end of the passage 152 is a short pipe-section 155, the outer end of which is loosely mounted in a coupling 156, so as to permit the revolution of the shaft and pipe-section. A steam-pipe 157 enters the coupling 156. In like manner a short pipe-section 158 is screwed into the end of the passage 153 and has its outer end loosely mounted in a coupling 159, with which communicates an escape-pipe 160. By an inspection of Fig. 11 it will be clearly seen that steam may be supplied continuously to all of the lower dies to heat the same, entering by the pipe 157 and escaping by the pipe 160.

I will now describe the mechanism for lubricating the dies. Mounted on any suitable support 161 above the machine is an oil-tank 162, from which leads a pipe 163, which extends downward on one side of the machine and at its lower end is connected, by means of a branch pipe 164, with a spraying-frame 165 at one side thereof, as shown in Fig. 13. Said spraying-frame comprises a rectangular arrangement of pipes having perforations 166 near their upper sides, said frame being so disposed as to surround the upper die on all sides and so that when the upper die is raised the spray from the perforations 166 in the frame will thoroughly lubricate the surface of said die. A branch pipe 167 connects the pipe 163 above the machine with a similar pipe 168, which extends downward on the other side of the machine and is connected by a branch pipe 169 at its lower end to the opposite side of the spraying-frame. Each of the pipes 163 and 168 is provided with a valve 170 to regulate the flow of the oil, preferably causing the same to be fed in drops. Connected to the pipe 168 is a pipe 171, having a regulating-valve 172 and leading downward to and being connected with a spraying-frame 173, similar to the one previously described. As shown in Fig. 2, the frame 173 is arranged adjacent to the drum 22 below and at one side thereof and in such position as to directly face the respective dies on the drum as the latter is revolved, so that said dies may be successively lubricated. The frame 173 is located on the front side of the machine, and the arrangement is such that each die will be lubricated just before it is turned to the position to have the clay placed thereon. To supply the air for spraying the oil, I provide a compressed-air cylinder 174, suitably supported on the machine and supplied with air under pressure through a pipe 175, leading from an air-compressor. (Not shown.) From the air-compressor 174 leads a pipe 176, which is branched to enter the corresponding air-valve chambers 177 178, Fig. 1, one of said chambers with its valve being shown in detail in Fig. 5. From the valve-chamber 177 leads a pipe 179, having branches 180, which connect with the oil-pipes 163 and 168, while from the chamber 178 leads a pipe 181, which is given a downward extension and connects at 182 with the oil-pipe 171, leading to the lower spraying-frame 173. Referring to Fig. 5, the inlet of compressed air to each air-valve chamber is controlled by a gate-valve 183, pivoted at 184 and having fixed to it one end of a weighted rod 185. Pivotally secured at its upper end to the rod 185, intermediate the ends thereof, is a depending arm 186. Each arm 186 works in a guide-frame 187 and has its lower end beveled, as indicated at 188. Arranged at a suitable distance apart on the outer face of the cam-wheel 114 are two tappets 189 190, having beveled ends, the tappet 190 being arranged at a greater distance from the face of the cam-wheel than the tappet 189, so that it will only strike one of the arms 186 186ᵃ while said arms are arranged in the line of travel of their respective tappets, as shown in Fig. 1. As arranged the tappet 189 operates the arm 186 of the valve-chamber 178 and the tappet 190 the arm 186ᵃ of the valve-chamber 177. The operation of the machine will now be described, first premising that the relative positions of the parts illustrated in Fig. 1 are preserved throughout the several views illustrating the operating mechanism.

In the position of the parts shown in Fig. 1 both arms 186 186ᵃ have been actuated by their tappets and both dies have accordingly been lubricated. The drum 22 has been turned to bring the face 24 of the platen-drum 22 with its die 29 immediately under the upper die, which is about to descend, and the arm 135 of the bell-crank lever has just entered an eccentric portion 191 of the camway 133, which portion is so arranged as to draw the arm 135 upward. The cam-wheels 114 115 continuing to revolve in the direction indicated by the arrow in Fig. 2, the cross-heads 138 139 will be moved under the drum by the lever mechanism described, and by means of the recesses 140 in said cross-heads the drum will be exactly centered, so that when the upper die descends the pressure will be distributed equally over the lower die 29, opposing it. Said cross-heads also support the drum during the pressing operation, as stated. At the same time the pins 121 will pass into eccentric portions 192 of the camways 116, thereby drawing the toggle-arms 103 104 downward and pushing the bar 95 outward or toward the left in Fig. 1. This movement of said bar straightens the toggle-levers 93 97, thereby forcing the core-box 31 downward in advance of the upper die. As this movement continues the pins 99 on said bar will engage the toggle-arms 86, thereby straightening the toggle-levers 85 86 and forcing the upper die 42 downward. As the said toggle-levers reach the dead-center or a position slightly beyond it the end 89 of the bar 88 will strike the stop 90 and prevent further movement thereof. Previous to the descent of the core-box and die a slab of clay will have been placed on the die 29 of the face 24, and said clay will be pressed by said core-box and die in their descent into the shape shown in Fig. 17. For the pressing operation the pins 121 pass into relatively straight portions 193 of the camways 116. Upon leaving the parts 193 of the camways said pins pass into eccentric portions 194 thereof, which operates to first raise the core-box clear of the pressed article, as shown in Fig. 16, and then by engagement of the top of the core-box with the set-screw 102 to raise the upper die. This movement of the upper die is only slight, as the pins 121 at once pass into concentric portions 195 of the camways, which holds the upper die stationary for a short interval to permit the tile to fall therefrom, if necessary. Said pins next strike an eccentric portion 196, whereby the die and core-box will be raised, and then pass into a concentric portion 197, operating to hold the core-box and die elevated. While the above operation is taking place the escape wheel or disk 131 and the mutilated gear 129 will have passed from the positions shown in full lines in Figs. 9 and 10 to the positions shown in dotted lines. The teeth of the mutilated gear now engage the teeth of the spur-gear 127 and turn said spur-gear a fifth-revolution. The star-wheel 125 will thereby be turned a like distance, one of its points passing into the recess 132 for this purpose. Then the round portion of the escape-wheel engages a curved face of said star-wheel and prevents further revolution thereof. The revolution of the spur-gear imparts a like revolution to the drum, bringing its face 28 under the upper die. Just previous to the last-described movement, however, the end of the toggle-arm 135 will have passed from a concentric portion 198 of the camway 133, where the cross-heads were held stationary under the drum, to an eccentric portion 199, which operates to depress said toggle-arm and withdraw the cross-heads, and then into a concentric portion 200 of said camway to hold the cross-heads withdrawn and permit revolution of the drum. Also the tappet 189 will have raised the arm 186 to open the air-valve 183 and admit air to the pipe 181 for spraying the die on face 28 of the drum, and the tappet 190 next operated the arm 186$^a$ to permit air to enter the pipe 180 for spraying the upper die. The drum is then revolved, as previously described, and the above operations repeated. It will be understood, of course, that after the appropriate die on the drum has been lubricated and before the drum is revolved a slab of clay is placed on the lubricated die to be carried under the upper die. This is done by an attendant at one side of the machine, while after the drum is revolved the pressed tile is removed from the die 29, which has been under the upper die, by an attendant on the opposite side of the machine.

What I claim as my invention is—

1. In a machine for pressing roofing-tiles, clay shingles, and the like, in combination with the dies, spraying devices therefor connected with an oil-supply, a compressed-air tank, and means for intermittently admitting compressed air to said spraying devices.

2. In a machine of the class described, in combination with the dies, spraying-frames located adjacent thereto, oil-supply pipes leading to said frames, a compressed-air tank, pipes connecting said air-tank and oil-supply pipes, and means for intermittently supplying compressed air to said oil-supply pipes.

3. In a machine of the class described, in combination with the upper die and a platen-drum, spraying-frames located, respectively, adjacent to each, an oil-supply pipe communicating with each frame, a compressed-air tank, pipes affording communication between said air-tank and the oil-supply pipes, each of said pipes having an air-valve, and means for operating first one and then the other of said air-valves.

4. In a machine of the class described, in combination with the upper die and a revoluble platen-drum, means for operating the same comprising a cam-wheel, spraying-frames located, respectively, in proximity to said die and drum, an oil-supply pipe communicating with each frame, a compressed-air tank, pipes affording communication between said air-tank and the oil-supply pipes, each of said pipes having air-valve mechanism, and means carried by said cam-wheel for operating first one and then the other of said air-valve mechanisms.

5. In a machine of the class described, in combination with the upper die and a revoluble platen-drum, means for operating the same comprising a cam-wheel, spraying-frames located, respectively, in proximity to said die and drum, an oil-supply pipe communicating with each frame, a compressed-air tank, pipes affording communication between said air-tank and the oil-supply pipes, each of said pipes having air-valves provided with pendent arms, and tappets carried by said cam-wheel for operating first one and then the other of said arms.

6. In a machine of the class described, in combination with a lower die, upper die mechanism comprising a die and a core-box, and means for operating said upper die mechanism, whereby, after the same has been lowered, the core-box will first be raised to clear the article pressed, then the upper die will be raised a short distance and held stationary, and then the core-box and upper die will be raised together.

7. In a machine of the class described, in combination with a lower die, a vertically-movable core-box, toggle-levers connected to said core-box, a bar connected to said toggle-levers for operating the same, means for reciprocating said bar, a die slidably mounted in said core-box, toggle-levers connected to said die, a set-screw carried by the die and located above the core-box and adapted to be engaged by the core-box in the upward movement thereof, and stops carried by said bar for operating the toggle-levers of said die.

8. In a machine of the class described, in combination with a lower die, a vertically-movable core-box, toggle-levers connected to said core-box, a bar connected to said toggle-levers for operating the same, means for reciprocating said bar, a die slidably mounted in said core-box and having standards projecting through the top thereof, toggle-levers connected to said standards, stops on said bar for operating said last-named toggle-levers, a support mounted on said standards, and a set-screw engaging in said support and adapted to be engaged by the core-box in the upward movement thereof.

9. In a machine of the class described, in combination with a lower die, a vertically-movable core-box, toggle-levers connected to said core-box, a bar connected to said toggle-levers for operating the same, a die slidably mounted in said core-box, toggle-levers connected to said die, stops on said bar for operating the last-named toggle-levers, a toggle-lever connected to one end of said bar, a cam-bar operatively connected to said toggle-lever, a pair of cam-wheels having similar cam-ways, means for revolving said cam-wheels, and pins projecting from opposite sides of said cam-bar and engaging in the camways of said cam-wheels.

10. In a machine of the class described, in combination with the upper movable die, a polygonal platen-drum mounted on a shaft, a star-wheel and a spur-gear fast on said shaft, a revolving shaft having a circular disk provided with a peripheral recess, and a mutilated gear, fast thereon, said mutilated gear being adapted to engage the spur-gear whereby to bring the faces of the drum successively in position, and said disk being adapted to engage the star-wheel to prevent movement of the drum except at the time said gears engage.

11. In a machine of the class described, in combination with the revoluble platen-drum and means for intermittently turning the same, means movable into engagement with the drum to support the same during the pressing operation.

12. In a machine of the class described, in combination with the revoluble platen-drum and means for intermittently turning the same, means movable automatically into engagement with the drum to support the same during the pressing operation.

13. In a machine of the class described, in combination with the revoluble polygonal platen-drum and means for intermittently turning the same to bring its faces successively into position, cross-heads slidably mounted beneath said drum, and having V-shaped grooves, and means, such as described, operating to slide said cross-heads inward beneath the drum whereby said grooves will engage an angle thereof and center the drum and support it during the pressing operation, and then to withdraw said cross-heads.

In testimony whereof I have hereunto set my hand in presence of two subscribing witnesses.

ABRAHAM B. KLAY.

Witnesses:
D. J. CABLE,
C. F. STOLZENBOTH.